(12) United States Patent
Buyuksahin et al.

(10) Patent No.: US 12,004,063 B2
(45) Date of Patent: Jun. 4, 2024

(54) INFRASTRUCTURE CONTROLLER FOR AN INFRASTRUCTURE

(71) Applicant: NXP B.V., San Jose, CA (US)

(72) Inventors: Mehmet Ufuk Buyuksahin, Graz (AT); Wolfgang Eber, Graz (AT); Dorian Haslinger, Nestelbach bei Graz (AT)

(73) Assignee: NXP B.V., Eindhoven (NL)

( * ) Notice: Subject to any disclaimer, the term of this patent is extended or adjusted under 35 U.S.C. 154(b) by 361 days.

(21) Appl. No.: 17/643,853

(22) Filed: Dec. 13, 2021

(65) Prior Publication Data

US 2022/0201586 A1 Jun. 23, 2022

(30) Foreign Application Priority Data

Dec. 17, 2020 (EP) .................................. 20215148

(51) Int. Cl.
*H04W 4/33* (2018.01)
*H04W 4/40* (2018.01)
(Continued)

(52) U.S. Cl.
CPC ............ *H04W 4/80* (2018.02); *H04W 4/33* (2018.02); *H04W 4/40* (2018.02); *H04W 4/70* (2018.02);
(Continued)

(58) Field of Classification Search
CPC ...... B60R 25/20–257; G01C 21/20–36; G07C 9/00–00944; G07C 2009/0019–00992; G07C 2209/60–65; H04B 17/0082–3913; H04L 12/2803–2838; H04L 2012/284–285; H04L 12/40–417; H04L 2012/40208–40293; H04M 15/80–8094; H04W 4/24–80; H04W 8/005–245;
(Continued)

(56) References Cited

U.S. PATENT DOCUMENTS 10,419,984 B2 9/2019 Hrabak et al.
10,440,576 B1 * 10/2019 Casamassima ......... H04W 4/40
(Continued)

FOREIGN PATENT DOCUMENTS

CN 111279729 A 6/2020

*Primary Examiner* — Timothy J Weidner (57) ABSTRACT

An infrastructure-controller (206) for an infrastructure (202), wherein the infrastructure has a plurality of Bluetooth Low Energy, "BLE", nodes (208, 210, 212) associated with it. The infrastructure-controller (206) is configured to: identify one of the plurality of BLE nodes as a current-BLE-node (212), and activate the current-BLE-node (212) for communication with a key (204) using BLE signals; determine a communication-quality-indicator for each of the plurality of BLE nodes (208, 210, 212), that represents the quality of communication with the key (204); based on the communication-quality-indicators, identify one of the plurality of BLE nodes as a next-BLE-node (210); and provide connection-information to the next-BLE-node (210) using out-of-band signalling (214). The infrastructure-controller (206) can then deactivate the current-BLE-node (212); and activate the next-BLE-node (212) for continued communication with the key (204) using BLE signals.

20 Claims, 3 Drawing Sheets

(51) Int. Cl.
*H04W 4/70* (2018.01)
*H04W 4/80* (2018.01)
*H04W 36/00* (2009.01)
*H04W 36/18* (2009.01)
*H04W 36/30* (2009.01)
*H04W 40/12* (2009.01)
*H04W 40/24* (2009.01)
*H04W 40/36* (2009.01)
*H04W 40/38* (2009.01)

(52) U.S. Cl.
CPC ....... *H04W 36/0055* (2013.01); *H04W 36/03* (2018.08); *H04W 36/18* (2013.01); *H04W 36/30* (2013.01); *H04W 40/12* (2013.01); *H04W 40/248* (2013.01); *H04W 40/36* (2013.01); *H04W 40/38* (2013.01)

(58) Field of Classification Search
CPC ... H04W 12/009–80; H04W 24/02–10; H04W 36/00–385; H04W 40/005–38; H04W 48/02–20; H04W 60/005–06; H04W 64/003–006; H04W 76/10–50; H04W 84/005–22; H04W 88/02–12; H04W 92/02–04; H04W 92/10; Y02D 30/70
See application file for complete search history.

(56) References Cited

U.S. PATENT DOCUMENTS

| | | |
|---|---|---|
| 2010/0254345 A1 | 10/2010 | Raravi et al. |
| 2016/0320469 A1* | 11/2016 | Laifenfeld .............. H04W 4/40 |
| 2020/0086829 A1 | 3/2020 | Wall et al. |
| 2020/0118372 A1 | 4/2020 | Stitt et al. |
| 2021/0051538 A1 | 2/2021 | Huang |

* cited by examiner

INFRASTRUCTURE CONTROLLER FOR AN INFRASTRUCTURE

CROSS-REFERENCE TO RELATED APPLICATIONS

This application claims the priority under 35 U.S.C. § 119 of European Patent application no. 20215148.6, filed on 17 Dec. 2020, the contents of which are incorporated by reference herein.

FIELD

The present disclosure relates to an infrastructure controller for an infrastructure such as a building or a vehicle to which a user desires access

SUMMARY

According to a first aspect of the present disclosure there is provided an infrastructure-controller for an infrastructure, wherein the infrastructure has a plurality of Bluetooth Low Energy, "BLE", nodes associated with it, the infrastructure-controller configured to:
identify one of the plurality of BLE nodes as a current-BLE-node, and activate the current-BLE-node for communication with a key using BLE signals;
determine a communication-quality-indicator for each of the plurality of BLE nodes, that represents the quality of communication with the key;
based on the communication-quality-indicators, identify one of the plurality of BLE nodes as a next-BLE-node;
provide connection-information to the next-BLE-node using out-of-band signalling;
deactivate the current-BLE-node; and
activate the next-BLE-node for continued communication with the key using BLE signals.

Advantageously, such an infrastructure-controller can achieve a hand-over from one BLE node to another that is quick and seamless from the perspective of the key. This can be achieved because the connection-information is available at the next-BLE-node when it is activated, and therefore a full connection procedure does not have to be restarted for the next-BLE-node. This can greatly improve the user experience.

In one or more embodiments the plurality of BLE nodes are for sending and receiving signals to and from a key at a frequency of 2.4 GHz.

In one or more embodiments the communication-quality-indicators comprise RSSI-values.

In one or more embodiments the communication-quality-indicators comprise a count of missed connection events.

In one or more embodiments the infrastructure-controller is configured to:
determine a communication-quality-indicator for the current-BLE-node; and
determine the communication-quality-indicators for each of the plurality of BLE nodes in response to the communication-quality-indicator for the current-BLE-node satisfying a consider-node-change-criterion.

In one or more embodiments the communication-quality-indicator for the current-BLE-node comprises an RSSI-value. The consider-node-change-criterion can comprise an RSSI-threshold such that the infrastructure-controller is configured to determine the communication-quality-indicators for each of the plurality of BLE nodes in response to the RSSI-value for the current-BLE-node being less than the RSSI-threshold.

In one or more embodiments the communication-quality-indicators for the current-BLE-node comprises a count of missed connection events. The consider-node-change-criterion can comprise a missed-connection-threshold such that the infrastructure-controller is configured to determine the communication-quality-indicators for each of the plurality of BLE nodes in response to the count of missed connection events for the current-BLE-node being greater than the missed-connection-threshold.

In one or more embodiments the infrastructure-controller can identify one of the plurality of BLE nodes as the next-BLE-node by selecting the BLE node that has the communication-quality-indicator that represents the highest quality connection.

In one or more embodiments the infrastructure-controller can be configured to:
determine a relative-key-location, which represents the location of the key relative to the infrastructure; and
identify one of the plurality of BLE nodes as the next-BLE-node based on the relative-key-location.

In one or more embodiments the infrastructure-controller can be configured to:
determine a key-node-distance for each of the plurality of BLE nodes, which represents the distance between the key and the respective BLE node; and
identify one of the plurality of BLE nodes as the next-BLE-node based on the key-node-distances.

In one or more embodiments the infrastructure-controller can be configured to:
identify one of the plurality of BLE nodes as the next-BLE-node by selecting the BLE node that has the lowest key-node-distance.

In one or more embodiments the infrastructure-controller can be configured to activate or deactivate the plurality of BLE nodes by sending out-of-band signalling to the BLE nodes, wherein the out-of-band signalling is out of band with respect to the BLE signals.

In one or more embodiments the out-of-band signalling comprises signalling sent over a Controller Area Network bus.

According to a further aspect of the present disclosure there is provided a computer-implemented method comprising:
identifying one of a plurality of Bluetooth Low Energy, "BLE", nodes as a current-BLE-node, and activating the current-BLE-node for communication with a key using BLE signals;
determining a communication-quality-indicator for each of the plurality of BLE nodes, that represents the quality of communication with the key;
identifying one of the plurality of BLE nodes as a next-BLE-node based on the communication-quality-indicators;
providing connection-information to the next-BLE-node using out-of-band signalling;
deactivating the current-BLE-node; and
activating the next-BLE-node for continued communication with the key using BLE signals.

According to a further aspect of the present disclosure, there is provided a computer program configured to perform any method disclosed herein.

There is also provided an infrastructure, including a vehicle, comprising any infrastructure-controller disclosed herein.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

Electronic keys can be used to obtain access to an infrastructure (such as a building or a vehicle). The functionality of the key can be provided by a key fob or by a portable communications device such as a smartphone. The key can exchange messages with the infrastructure using radio frequency (RF) signalling in order to request access to the infrastructure, such as requesting that a door associated with the infrastructure is unlocked.

The stability of an RF (sub GHz, Bluetooth Low Energy (BLE), Wifi) connection can be very important when it is used as a control interface. Any reconnections that may be required can lead to unwanted delays and latencies, and therefore can have an impact on overall system performance and hence user experience.

An RF connection to a single node associated with the infrastructure can be interrupted, especially in noisy or crowded environments. Even if it is possible to select a best infrastructure node out of a plurality of nodes for the key to connect with at the beginning, some physical obstructions (such as the position of a human body) might change dynamically after that first connection. For instance, a line-of-sight between RF devices could be disturbed by a user or someone else while the key is connected to the infrastructure using RF. In such cases, another infrastructure node at a different location on the infrastructure might have line-of-sight and hence better reception, which would allow better connection stability. Therefore, handing over to this infrastructure node (at runtime) can beneficially increase the stability of the RF connection.

Figure 1:
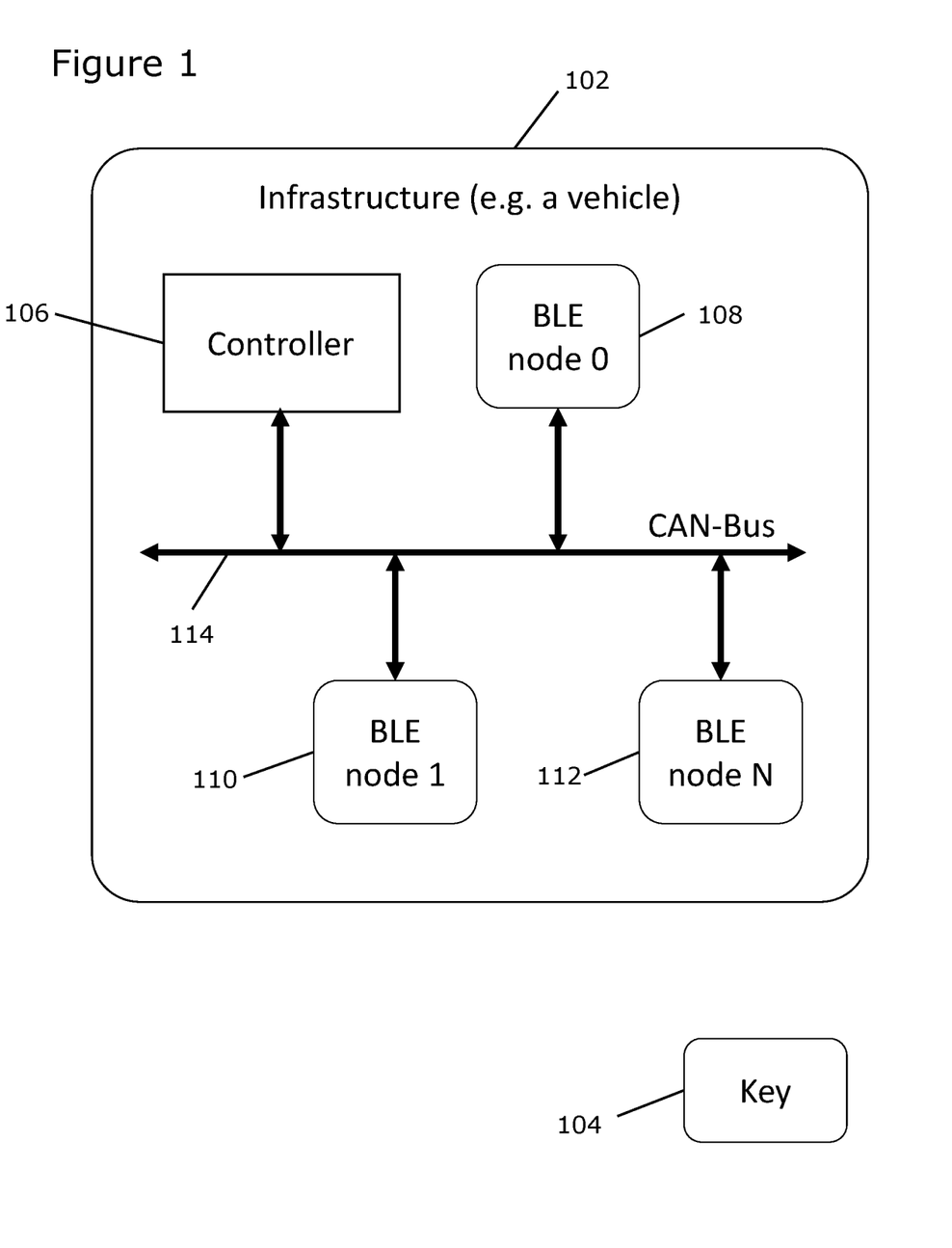
FIG. 1 shows an example embodiment of the present disclosure that includes an infrastructure and a key.

FIG. 1 shows an example embodiment of the present disclosure that includes an infrastructure 102 and a key 104. The infrastructure 102 includes an infrastructure-controller 106. The infrastructure 102 can be a car, a vehicle, a building, a room, public transport (such as handsfree public transport), a "smart" car, a "smart" home, any system (including an indoor system) that uses RF communication, or any other environment including those mentioned in all applications discussed in CCC (car connectivity consortium) and the FiRa consortium. The key 104 can be a key fob. Alternatively, the functionality of the key 104 can be provided by a mobile communications device such as a smartphone.

The infrastructure 102 has a plurality of Bluetooth Low Energy (BLE) nodes 108, 110, 112 associated with it. In some examples the BLE nodes may be referred to as anchors. Each BLE node 108, 110, 112 can have a receive antenna (not shown) and a BLE microcontroller (not shown). The BLE nodes 108, 110, 112 are for sending and receiving BLE signals to and from the key 104. The BLE signals have a frequency of 2.4 GHz, and therefore a BLE node can equivalently be referred to as a node that is configured to send and receive signals having a frequency of 2.4 GHz. In some examples, the functionality of the infrastructure-controller 106 can be provided by one or more of the BLE nodes 108, 110, 112.

In this example, the BLE nodes 108, 110, 112 are connected to a Controller Area Network (CAN) bus, although, in other examples, the BLE nodes 108, 110, 112 can communicate with the infrastructure-controller 106 and/or the other BLE nodes using other types of signalling such as low frequency (LF) signalling, Local Interconnect Network (LIN) signalling or ethernet signalling. These are all examples of out-of-band signalling, in that they are out of band with respect to the BLE signals that are sent between the BLE nodes 108, 110, 112 and the key 104.

The infrastructure-controller 106 can identify one of the plurality of BLE nodes 108, 110, 112 as a current-BLE-node. For instance, the BLE Node N 112 in FIG. 1 can be identified as the current-BLE-node. As will be discussed in detail below, the infrastructure-controller 106 can identify the BLE node that has the strongest communication link with the key 104 as the current-BLE-node. The infrastructure-controller 106 can then activate the current-BLE-node 112 for communication with the key using BLE signals, for instance by sending an appropriate instruction to the current-BLE-node over the CAN bus 114. As is known in the art, such BLE signals can be used to communicate data between the infrastructure 102 and the key 104 as part of an authentication process before granting access to the infrastructure, for example by unlocking a door of the infrastructure 102.

The infrastructure-controller 106 can determine a communication-quality-indicator for each of the plurality of BLE nodes 108, 110, 112. The communication-quality-indicator represents the quality of the BLE communication for the respective BLE node 108, 110, 112 with the key 104. As will be discussed in detail below, the infrastructure-controller 106 can periodically determine the communication-quality-indicator for each of the plurality of BLE nodes 108, 110, 112. Alternatively, the infrastructure-controller 106 can periodically determine the communication-quality-indicator for each of the plurality of BLE nodes 108, 110, 112 on demand—for instance in response to a determination that a communication-quality-indicator for the current-BLE-node has a value that indicates that the quality of its connection with the key 104 has deteriorated or is too low.

Then, based on the communication-quality-indicators, the infrastructure-controller 106 can identify one of the plurality of BLE nodes 108, 110, 112 as a next-BLE-node. As discussed in detail below, the identification of the next-BLE-node can involve processing the communication-quality-indicators associated with the plurality of BLE nodes 108, 110, 112 in order to select one that is expected to have a satisfactory BLE communication link with the key 104. For instance, if the key 104 (in the position that it is shown in FIG. 1) moves to the left it will be closer to BLE node 1 110 than BLE node N 112. In which case, BLE node 1 110 may be identified as the next-BLE-node because it is the BLE node that has the best BLE connection with the key 104.

Once the next-BLE-node has been identified, the infrastructure-controller 106 provides connection-information to the next-BLE-node. The connection-information is known in the art as the information that is required by the BLE node in order to communicate with the key 104 using BLE, and includes one or more BLE connection parameters. The connection-information is provided to the next-BLE-node using any of the types of out-of-band signalling that are identified herein. In this example, the out-of-band signalling is provided over the CAN bus 114. The connection-information may be provided only to the next-BLE-node, or it may be provided to all of the BLE nodes (which of course includes the next-BLE-node). It will be appreciated that the connection-information can be provided to the next-BLE-node directly from the current-BLE-node—i.e. the BLE node that is currently activated for communication with the key 104 using BLE signals—or can be provided to the next-BLE-node by the infrastructure-controller 106. Either way, however it is implemented, the functionality of the infrastructure-controller 106 can be said to cause the connection-information to be provided to the next-BLE-node.

The infrastructure-controller 106 can then deactivate the current-BLE-node (BLE node N 112 in the present example), for instance by sending an appropriate instruction to the current-BLE-node over the CAN bus 114. The infrastructure-controller 106 also activates the next-BLE-node (BLE node 2 110 in the present example) for continued communication with the key 104 using BLE signals.

Advantageously, the infrastructure 102 of FIG. 1 can achieve a hand-over from one BLE node 108, 110, 112 to another that is quick and seamless from the perspective of the key 104. This can be achieved because the connection-information is available at the next-BLE-node when it is activated, and therefore a full connection procedure does not have to be restarted for the next-BLE-node. This can greatly improve the user experience.

The functionality that is described with reference to FIG. 1 can enable one end of the BLE communication (the infrastructure 102 end) to include multiple physical nodes that are functionally interchangeable. The user end (the key 104 end) can be automatically connected to different ones of the physical nodes at the infrastructure 102 without additional delay or latency. In the example of FIG. 1, this involves (BLE) nodes communicating with each other using an out-of-band interface (i.e. CAN-Bus).

Figure 2:
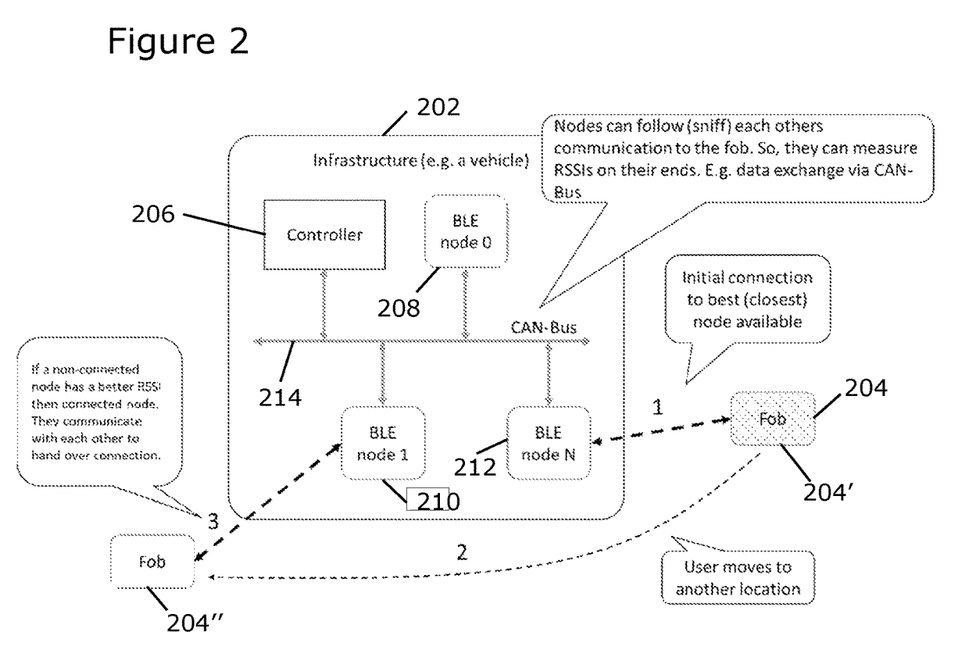
FIG. 2 shows an example embodiment of the present disclosure that includes an infrastructure and a fob, which is an example of the key of FIG. 1.

FIG. 2 shows an example embodiment of the present disclosure that is similar to that of FIG. 1. Features of FIG. 2 that are also shown in Figure have been given corresponding reference numbers in the 200 series, and will not necessarily be described again with reference to FIG. 2.

FIG. 2 shows an infrastructure 202 and a fob 204, which is an example of the key of FIG. 1. FIG. 2 will be used to describe in more detail the handover from one BLE node to another BLE node.

As discussed above, communication-quality-indicators are calculated for the BLE nodes 208, 210, 212 as part of the processing for handing over from one BLE node to another. I.e. for deactivating a current-BLE-node (in this example BLE node N 212) and activating a next-BLE-node (in this example BLE node 1 210).

The infrastructure-controller 206 can determine a communication-quality-indicator for the current-BLE-node. In some examples this determination can be made periodically. The infrastructure-controller 206 can then determine the communication-quality-indicators for each of the plurality of BLE nodes in response to the communication-quality-indicator for the current-BLE-node satisfying a consider-node-change-criterion. In this way, the communication-quality-indicator can be checked for the current-BLE-node, and only when it's quality drops to a sufficiently poor level does the infrastructure-controller 206 check the communication-quality-indicators of the other BLE nodes.

In one implementation, the communication-quality-indicators include Received Signal Strength Indicator values (RSSI-values). In such an implementation, the consider-node-change-criterion can comprise an RSSI-threshold such that the infrastructure-controller 206 is determines the communication-quality-indicators for each of the plurality of BLE nodes 208, 210, 212 in response to the RSSI-value for the current-BLE-node (BLE node N 212) being less than the RSSI-threshold.

Alternatively or additionally, the communication-quality-indicator include a count of missed connection events. For instance at least the current-BLE-node may have periodic connection events with the key 204, during which the BLE node exchanges BLE signalling with the key 204. In such an implementation, the consider-node-change-criterion can comprise a missed-connection-threshold such that the infrastructure-controller 206 determines the communication-quality-indicators for each of the plurality of BLE nodes in response to the count of missed connection events for the current-BLE-node being greater than the missed-connection-threshold.

The count of missed connection events that is provided as a communication-quality-indicator may be a total count, or a count in a preceding window of time. In one example, the periodic connection events should be every 10 ms. The communication-quality-indicator may count the number of successful connection events in the preceding window of time (e.g. 100 ms), and then subtract that from a predetermined number of expected connection events in the window (10 in this example) in order to determine a count of missed connection events. The count of missed connection events can then be compared with a missed-connection-threshold to determine whether or not the connection with the current-BLE-node is sufficiently poor that it warrants checking the quality of the connection with the other BLE nodes to determine if a handover to another BLE node should be made. For instance, for the numerical example described in this paragraph, the missed-connection-threshold may be 5, in which case the consider-node-change-criterion may be satisfied when the count of missed connection events is greater than 5 (out of the expected 10 connection events in the preceding window of time).

The infrastructure-controller 206 can then identify one of the plurality of BLE nodes as the next-BLE-node by selecting the BLE node 208, 210, 212 that has the communication-quality-indicator that represents the highest quality connection. In examples where the communication-quality-indicator includes an RSSI-value, the RSSI-value that has the highest value represents the highest quality connection. In examples where the communication-quality-indicator includes a count of missed connection events, the count of missed connection events that has the lowest value represents the highest quality connection. In examples where the communication-quality-indicator includes both a count of missed connection events and an RSSI-value, the communication-quality-indicator that represents the highest quality connection can be determined by a logical/mathematical combination of the count and the RSSI-value.

In the example of FIG. 2, the fob 204' is shown in an initial position to the right-hand side of the infrastructure 202. At this position, the fob 204' can establish a BLE connection with BLE node N 212 on the basis that the communication-quality-indicator for the connection with BLE node N 212 is the best, and therefore BLE node N 212 is identified as the current-BLE-node out of the plurality of BLE nodes. The communication-quality-indicator for the connection with BLE node N can be the best because the fob 204' is closest to BLE node N 212, although this is not necessarily always the case; other factors can influence the communication-quality-indicator such as the presence of obstructions in the line of sight between the fob 204' and the BLE node.

At a later time, the fob moves to a second location, which is shown in FIG. 2 with reference 204". Depending upon the implementation, the infrastructure-controller 206 can periodically check the communication-quality-indicators of the current-BLE-node (BLE node N 212) or all of the BLE nodes 208, 210, 212. This checking of the communication-quality-indicator can be referred to as "sniffing" the BLE communications between one or more of the BLE nodes 208, 210, 212 and the fob 204". As set out above, in some examples the RSSI can be measured for each of the BLE nodes 208, 210, 212 and the RSSI-values (or other communication-quality-indicators) can be exchanged over the CAN bus 214.

With the fob 204" in the second location, the infrastructure-controller 206 can check to see if there is a non-connected BLE node (i.e. a BLE node that is not the current-BLE-node) that has a better RSSI (or other communication-quality-indicator) than the connected BLE node (i.e. the current-BLE-node). If there is, then, as described above, the connection-information is provided to the identified next-BLE-node (which can involve the current-BLE-node and the next-BLE-node communicating with each other over the CAN bus 214) such that the BLE connection with the key 204 can be handed over to the next-BLE-node.

In some examples, after a connection is made to a BLE node (such as the current-BLE-node), the other BLE nodes that are not connected can go into a sniffing mode and measure communication-quality-indicators at their end. When the communication-quality-indicator satisfies a node-change-criterion (for instance the RSSI-value of the current connection gets lower than a threshold, or when the connected node misses a certain number of connection events), the infrastructure-controller 206 informs the other BLE nodes to prepare for a potential handover and provides the required information to one or more of the other BLE nodes over an out-of-band interface (i.e. CAN bus in FIG. 2). Then, the infrastructure-controller 206 can decide which of the other BLE nodes (if any) should take over the BLE connection with the key 204. Then, the BLE connection continues with the new BLE node and the cycle restarts.

In the example that is illustrated in FIG. 2, BLE node 1 210 is identified as the next-BLE-node when the fob 204" is in the second position relative to the infrastructure 202.

In some examples the infrastructure-controller 206 can use additional or alternative information to identify the next-BLE-node from the plurality of BLE nodes. For example the infrastructure-controller 206 can determine a relative-key-location, which represents the location of the key/fob 204 relative to the infrastructure 202. For instance, such a relative-key-location can be determined by performing ranging operations that involve the key/fob 204 exchanging ultra-wideband (UWB) signals with the infrastructure 202. The infrastructure-controller 206 can then identify one of the plurality of BLE nodes as the next-BLE-node based on the relative-key-location. For instance, the infrastructure-controller 206 can have access to BLE-node-locational-data that represents the position of each BLE node 208, 210, 212 on (or associated with) the infrastructure 202. Then, the infrastructure-controller 206 can select the most appropriate BLE node as the next-BLE-node based on the relative-key-location and the BLE-node-locational-data.

As a further example, the infrastructure-controller 206 can determine a key-node-distance for each of the plurality of BLE nodes, which represents the distance between the key 204 and the respective BLE node. Again, the key-node-distance can be determined using any process that is known in the art, which can include ranging using UWB signalling. The infrastructure-controller 206 can then identify one of the plurality of BLE nodes as the next-BLE-node based on the key-node-distances. For example, the infrastructure-controller 206 can identify one of the plurality of BLE nodes as the next-BLE-node by selecting the BLE node that has the lowest key-node-distance.

In the example of FIG. 2, the infrastructure-controller 206 activates or deactivates the BLE nodes 208, 210, 212 by sending out-of-band signalling to the BLE node. The out-of-band signalling is out of band with respect to the BLE signals that the BLE nodes 208, 210, BLE node N 212 exchange with the fob 204'. As shown in the FIG. 2, the out-of-band signalling in this example is CAN signalling that is exchanged over the CAN bus 214.

A specific example of the present disclosure will now be described in the context of car access. That is, the infrastructure that is described above is a car in this example, and the BLE nodes that are described above will be referred to more generally as RF nodes in this example.

The car has multiple RF nodes located at bumpers, door handles, the roof and/or the trunk. A user carrying an RF connected fob or mobile phone (as a digital key) approaches his/her car. The key device (fob or mobile device) might have a good line-of-sight at first but then it might be lost due to user movements.

For instance, one person is approaching to the car, and e.g. the anchor on the roof will be able to connect in far distance (e.g. 20 m). As the user comes closer to the car, the connection quality goes down, due to radiation pattern of the roof top anchor. This bad connection quality could lead to additional delay/bad user experience due to lost packages or, worst case, to a lost connection. To avoid this scenario, and to enhance user experience, a smart hand over methodology is used to ensure a fast handover between the radio anchors (e.g. BLE, Wifi etc.). In case of smart hand over methodology, the RF anchors can use an out-of-band communication link such as CAN, LIN, etc. to stay aligned on ongoing activities.

Coming back to the scenario above, as the person is moving closer to the car, the connected RF node will inform the other RF node(s) about connection status in link quality indication such as RSSI values. This may be coordinated by a separate infrastructure-controller. Alternatively, the functionality of the infrastructure-controller that is described above may be performed by one of the RF nodes or collectively by a plurality of the BLE nodes. The other RF node(s) can go into "spy" mode and only measure the link quality indication e.g. follow RSSI values or N/S (noise to signal) ratio. In case of determined bad link quality indication, the node with the best radio link quality indication can take over the connection. Due to this "smart" hand over methodology, and continuously observing of the RF connection, the best possible user experience can be achieved.

Beneficially, such a scenario should not decrease reaction time of the system by losing RF connection and reconnection to another node. Also, this solution can allow the node, with a poor line-of-sight at first, to cooperate with an another node with a good line-of-sight when the user puts the remote device in his/her back pocket, via the CAN-Bus to handover quickly.

Figure 3:
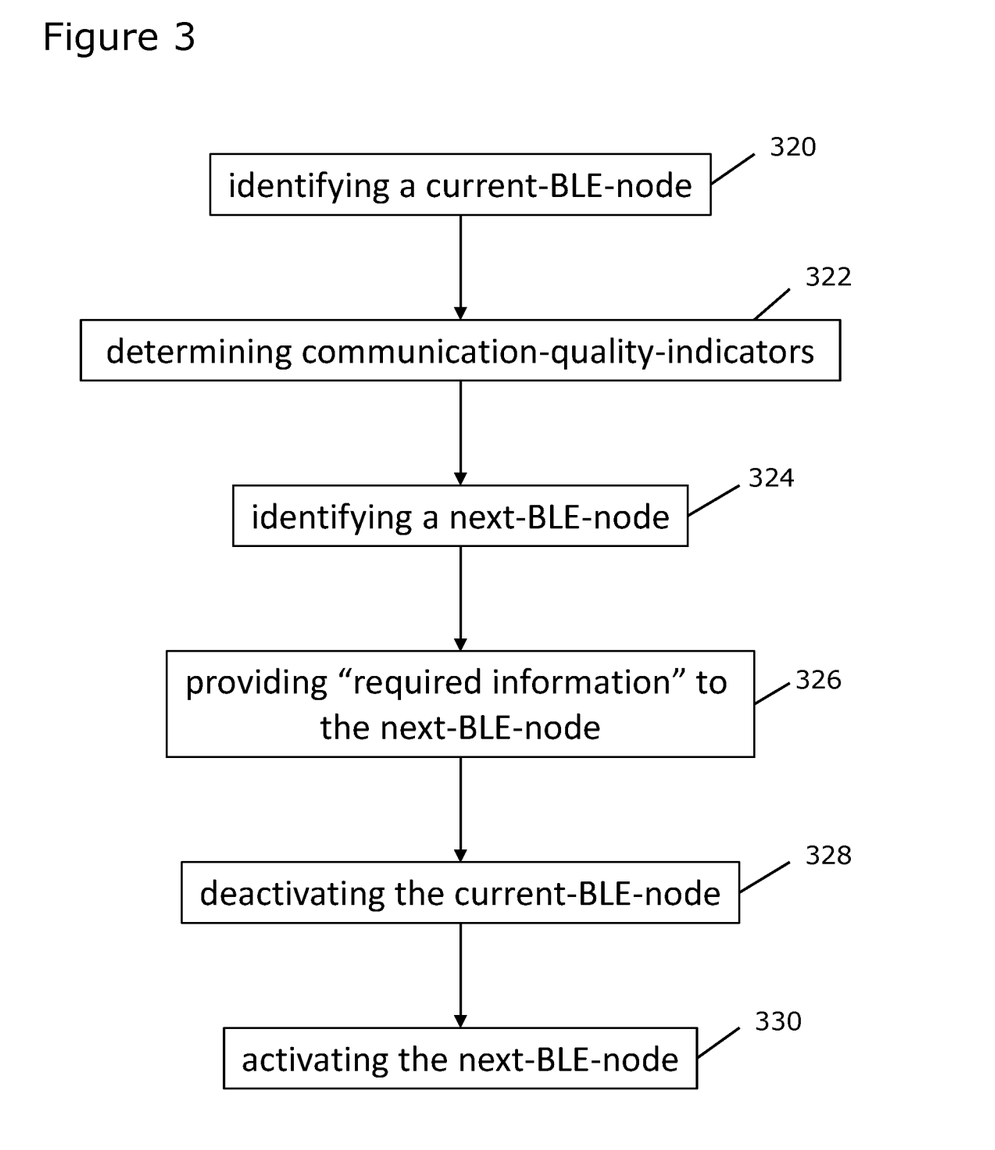
FIG. 3 shows schematically an example embodiment of a computer-implemented method.

FIG. 3 shows schematically an example embodiment of a computer-implemented method.

The method begins at step 320 by identifying one of a plurality of Bluetooth Low Energy, "BLE", nodes as a current-BLE-node, and activating the current-BLE-node for communication with a key using BLE signals. As discussed above, this can include identifying the BLE node that has the best BLE connection with the key as the current-BLE-node.

At step 322, the method determines a communication-quality-indicator for each of the plurality of BLE nodes. The communication-quality-indicator represents the quality of communication with the key, and can be a RSSI-vale in some examples.

At step 324, the method identifies one of the plurality of BLE nodes as a next-BLE-node based on the communication-quality-indicators. This can be triggered by an earlier identification that the communication-quality-indicator for the current-BLE-node has dropped below a threshold level. Alternatively or additionally, step 324 can be performed periodically.

At step 326 the method provides the connection-information to the next-BLE-node using out-of-band signalling, such that the next-BLE-node can seamlessly take over the BLE connection with the key without having to reconnect and therefore result in a temporary loss of connection.

At step 328 the method deactivates the current-BLE-node, and at step 330 the method activates the next-BLE-node for continued communication with the key using BLE signals. In this way the handover from the current-BLE-node to the next-BLE-node is complete.

Examples described herein can address one or both of the following problems:
- weak RF connection stability due to physical obstacles; and
- decreased system performance, bad user experience, extended end-to-end (E2E) time due to BLE reconnection delay.

These problems can be addressed by RF/BLE nodes cooperating via out-of-band communication with or without a central supervision. The RF/BLE nodes can be aware of each other and can cooperate to keep connection stability high at all times. The RF/BLE nodes can continuously check which node has the best link quality indication.

Advantageously, examples described herein can leverage an out-of-band interface to cooperate between RF/BLE nodes and decide to which node to handover the connection.

Furthermore, examples can make use of multiple nodes to increase RF/BLE coverage and thus improve user experience by handing over connection from one node to another by utilizing out-of-band communication (e.g. CAN, LIN). RF connection to a single node might be interrupted, especially in noisy or crowded environments. Obstructions might change dynamically after an initial connection is established. Therefore, a quick switch to a node with better reception will increase connection stability and thus user experience.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. An infrastructure-controller for an infrastructure, wherein the infrastructure has a plurality of Bluetooth Low Energy, "BLE", nodes associated with it, the infrastructure-controller configured to:

identify one of the plurality of BLE nodes as a current-BLE-node, and activate the current-BLE-node for communication with a key using BLE signals;
determine a communication-quality-indicator for each of the plurality of BLE nodes, that represents the quality of communication with the key;
based on the communication-quality-indicators, identify one of the plurality of BLE nodes as a next-BLE-node;
provide connection-information to the next-BLE-node using out-of-band signalling;
deactivate the current-BLE-node; and
activate the next-BLE-node for continued communication with the key using BLE signals.

2. The infrastructure-controller of claim 1, wherein the plurality of BLE nodes are for sending and receiving signals to and from a key at a frequency of 2.4 GHz.

3. The infrastructure-controller of claim 1, wherein the communication-quality-indicators comprise RSSI-values.

4. The infrastructure-controller claim 1, wherein the communication-quality-indicators comprise a count of missed connection events.

5. The infrastructure-controller of claim 1, configured to:
determine a communication-quality-indicator for the current-BLE-node; and
determine the communication-quality-indicators for each of the plurality of BLE nodes in response to the communication-quality-indicator for the current-BLE-node satisfying a consider-node-change-criterion.

6. The infrastructure-controller of claim 5, wherein:
the communication-quality-indicator for the current-BLE-node comprises an RSSI-value; and
the consider-node-change-criterion comprises an RSSI-threshold such that the infrastructure-controller is configured to determine the communication-quality-indicators for each of the plurality of BLE nodes in response to the RSSI-value for the current-BLE-node being less than the RSSI-threshold.

7. The infrastructure-controller of claim 5, wherein:
the communication-quality-indicators for the current-BLE-node comprises a count of missed connection events; and
the consider-node-change-criterion comprises a missed-connection-threshold such that the infrastructure-controller is configured to determine the communication-quality-indicators for each of the plurality of BLE nodes in response to the count of missed connection events for the current-BLE-node being greater than the missed-connection-threshold.

8. The infrastructure-controller of claim 1, configured to:
identify one of the plurality of BLE nodes as the next-BLE-node by selecting the BLE node that has the communication-quality-indicator that represents the highest quality connection.

9. The infrastructure-controller of claim 1, configured to:
determine a relative-key-location, which represents the location of the key relative to the infrastructure; and
identify one of the plurality of BLE nodes as the next-BLE-node based on the relative-key-location.

10. The infrastructure-controller of claim 1, configured to:
determine a key-node-distance for each of the plurality of BLE nodes, which represents the distance between the key and the respective BLE node; and
identify one of the plurality of BLE nodes as the next-BLE-node based on the key-node-distances.

11. The infrastructure-controller of claim 10, configured to:
identify one of the plurality of BLE nodes as the next-BLE-node by selecting the BLE node that has the lowest key-node-distance.

12. The infrastructure-controller of claim 1, configured to activate or deactivate the plurality of BLE nodes by sending out-of-band signalling to the BLE nodes, wherein the out-of-band signalling is out of band with respect to the BLE signals.

13. The infrastructure-controller of claim 12, wherein the out-of-band signalling comprises signalling sent over a Controller Area Network bus.

14. A computer-implemented method comprising:
identifying one of a plurality of Bluetooth Low Energy, "BLE", nodes as a current-BLE-node, and activating the current-BLE-node for communication with a key using BLE signals;
determining a communication-quality-indicator for each of the plurality of BLE nodes, that represents the quality of communication with the key;
identifying one of the plurality of BLE nodes as a next-BLE-node based on the communication-quality-indicators;
providing connection-information to the next-BLE-node using out-of-band signalling;
deactivating the current-BLE-node; and
activating the next-BLE-node for continued communication with the key using BLE signals.

15. The method of claim 14, wherein the plurality of BLE nodes are for sending and receiving signals to and from a key at a frequency of 2.4 GHz.

16. The method of claim 14, wherein the communication-quality-indicators comprise RSSI-values.

17. The method of claim 14, wherein the communication-quality-indicators comprise a count of missed connection events.

18. The method of claim 14, further comprising:
determining a communication-quality-indicator for the current-BLE-node; and
determining the communication-quality-indicators for each of the plurality of BLE nodes in response to the communication-quality-indicator for the current-BLE-node satisfying a consider-node-change-criterion.

19. The method of claim 18, wherein:
the communication-quality-indicator for the current-BLE-node comprises an RSSI-value; and
the consider-node-change-criterion comprises an RSSI-threshold such that the infrastructure-controller is configured to determine the communication-quality-indicators for each of the plurality of BLE nodes in response to the RSSI-value for the current-BLE-node being less than the RSSI-threshold.

20. The method of claim 18, wherein:
the communication-quality-indicators for the current-BLE-node comprises a count of missed connection events; and
the consider-node-change-criterion comprises a missed-connection-threshold such that the infrastructure-controller is configured to determine the communication-quality-indicators for each of the plurality of BLE nodes in response to the count of missed connection events for the current-BLE-node being greater than the missed-connection-threshold.

* * * * *